United States Patent [19]

Machida

[11] 4,043,667

[45] Aug. 23, 1977

[54] METHOD AND SYSTEM FOR PRINTING PHOTOGRAPHS

[75] Inventor: Masaaki Machida, Hachioji, Japan

[73] Assignee: Konishiroku Photo Industry Co., Ltd., Tokyo, Japan

[21] Appl. No.: 569,797

[22] Filed: Apr. 21, 1975

[30] Foreign Application Priority Data

Apr. 27, 1974    Japan ................................. 49-47136

[51] Int. Cl.² .............................................. G03B 27/04
[52] U.S. Cl. ...................................... 355/97; 355/83; 355/88
[58] Field of Search ..................... 355/77, 32, 35–38, 355/41, 67–71, 83, 88, 97, 103, 108

[56]           References Cited

U.S. PATENT DOCUMENTS

| | | | |
|---|---|---|---|
| 3,374,723 | 3/1968 | Baumbach | 355/83 X |
| 3,492,071 | 1/1970 | Limnios et al. | 355/69 X |
| 3,516,741 | 6/1970 | Thaddey | 355/38 X |
| 3,586,438 | 6/1971 | Gyori | 355/83 X |
| 3,716,299 | 2/1973 | Balint | 355/88 X |
| 3,768,903 | 10/1973 | Steinberger et al. | 355/38 |
| 3,768,905 | 10/1973 | Williams | 355/41 X |

*Primary Examiner*—Richard L. Moses
*Attorney, Agent, or Firm*—Bierman & Bierman

[57]            ABSTRACT

Method and apparatus for printing photographs comprising a plurality of memories for storing information comprising frame numbers and the number of pictures to be printed for a particular frame number. Means for obtaining the information stored and for printing a predetermined number of copies therefrom are also provided, along with exposure means for exposing the negative.

2 Claims, 15 Drawing Figures

METHOD AND SYSTEM FOR PRINTING PHOTOGRAPHS

The present invention is concerned with a method and system for printing photographs, and more specifically to a method and system which can automatically print photographs in accordance with orders of customers.

At present, the photographs can be printed by the method in which all the picture frames involved in a negative film strip are printed one by one when the negative film is developed (hereafter called simultaneous printing) and by the method in which the photographs are printed from the negative film, which has been developed, according to the ordered number of the picture frames and the ordered quantity of photos to be printed (hereafter called ordered printing).

Simultaneous printing often invites overexposure, no exposure or a blurring or disfocus of the picture. This requires, when treating size 135 films, an operation to remove vacant areas, or an operation to select correction keys for correcting color failure or density failure for the picture.

In spite of the simultaneous printing can successfully print more than 3000 photos per hour. The simultaneous printing method treats the long film without cutting it or splices several tens of film strips into a single strip and treats the single strip. In this method, the negative film is fed automatically and stopped exactly at the exposing position to effect printing.

Figure 1:
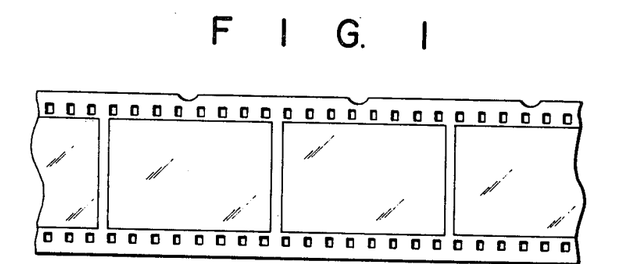
FIG. 1 shows a 135 film.

With the 135 size films, the picture position in relation to a negative film may be varied depending on loading of a film into a camera. Therefore, it is common practice to detect the picture and make notches corresponding to the position of the picture in order that the picture frame is correctly stopped at the exposing position in the printer by detecting said notch (see FIG. 1).

Figure 2:
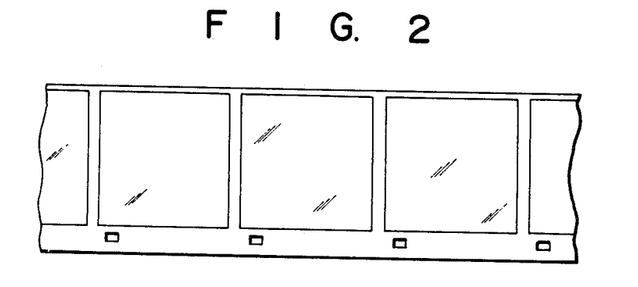
FIG. 2 shows a 126 film.
Figure 3:
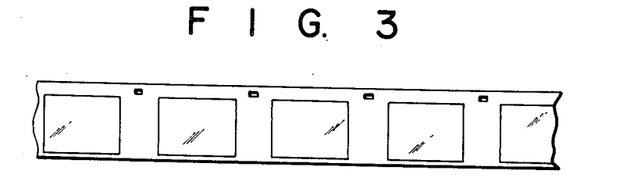
FIG. 3 shows an 110 film.

Also, with size 110 films and size 126 films, a hole is provided at the position of each picture frame on the film, so that the picture frame is accurately stopped at the exposing position by detecting the hole, as the exposing position of the camera has a mechanical relation with the hole (see FIG. 2 and FIG. 3).

In this way, it is highly efficient to prepare a print for each picture frame by automatically feeding a long or rolled film to the printer where the picture frame is automatically and precisely stopped for printing. Therefore, almost all printers have reduced exposure time, reduced time of paper feeding and reduced time of negative feeding in order to attain the desired speed for simultaneous printing. Further, it is also possible to automatically discriminate the color failure or density failure to speed up simultaneous printing, although it is not yet possible to omit printing of the pictures that are out of focus.

According to the order printing method, on the other hand, the operator finds the picture frames required by a customer out of the film strips that are usually cut to the length of about six frames and prints photographs by the quantity required by the customer. In this case, since the specified picture frames have to be selected out of the film strips that are placed in random sequence, and the selected picture frames have to be set correctly to the exposing position, the operation efficiency is very low, about 1/5 to 1/10 compared to the printing efficiency of the simultaneous printing.

Figure 4:
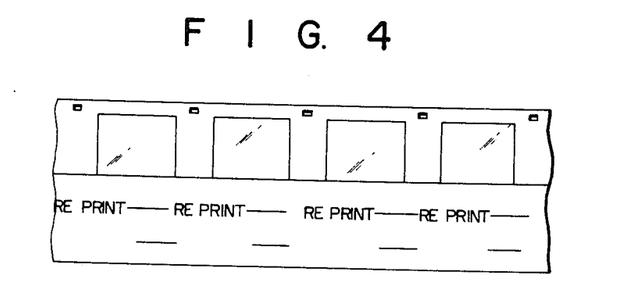
FIG. 4 shows an 110 film having markings attached at the lower part of the film.

For this reason, a marking is attached to the lower side of the negative film (110 film) before it is returned to the customer so tht the customer may specify the quantity to be printed on the marking corresponding to the position of a picture frame when he intends to have them printed again (FIG. 4).

In this case, it will be easy to find the frames specified with reference to the markings, but the job of printing the other working is the same as above to effect printing of the order. But attachment of the marking requires another operation, and necessity to erase the once written items when re-ordering print and stretching and shrinking between the marking and film make for additional problems; hence attachment of markings is not readily practicable. Further, since in 135 film, the positions of frame numbers are not always in conformity with the position of subject pictures, use of marking is not paticularly effective and rather gives adverse effects as mentioned above.

In view of such inconveniences, the present invention is to provide a method and apparatus for enhancing the efficiency of print orders.

Figure 5:
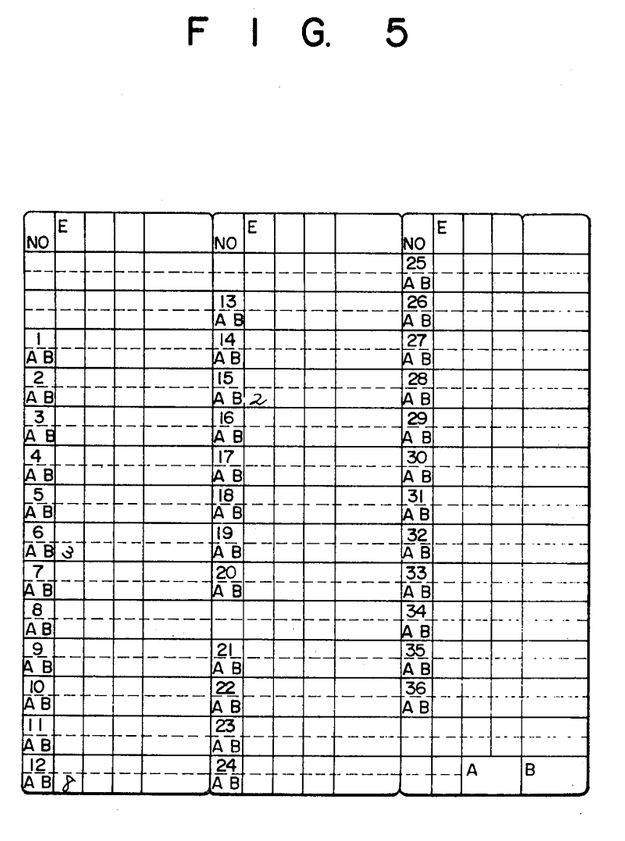
FIG. 5 shows an example of the order sheet on the bag.

Generally, the negative films that are ordered to be printed are strips respectively consisting of 4 to 6 picture frames. That is, ordinary negative films including 12-frame film, 20-frame film and 36-frame film are sold and are cut into several strips after development. These strips are enclosed in a bag or enclosure and may be contained in a random fashion when brought in for printing, or all of the strips may not be brought in. Some may not bring the strips which are not to be printed. Further, the bag will contain an order sheet. The order sheet may be attached to the bag or contained together with the films. An example is shown in FIG. 5.

The order sheet shown is that of a 135 film, according to which 3 pieces of 6A frames, 8 pieces of 12A frames and 2 pieces of 15frames A have been ordered. First, if the order sheet has not been filled, the clerk will write it on the order sheet and arrange the strips in order of increasing number to ease the printing operation for the worker. The arrangement may be troublesome. If a negative strip has not been contained in each casing, the arrangement will be very troublesome. However, once the negatives have been arranged, they being contained in the bag, they may be handed to the worker who performs printing; the worker will select the ordered picture frames written on the order sheet out of the strips and set them into the printer to print the ordered number of photos. All of such is conducted manually.

In printing photographs from reversal films, a print worker receives cassettes consisting of negative all of which are ordered to be printed. The worker takes one of the films, sets the quantity of prints to be printed and then conducts the printing operation. These process are repeated for each of the films. Also in this operation, operation efficiency is very low.

The present invention contemplates to effect the above-mentioned operation automatically.

In accordance with the present invention, there is provided a method of printing photographs comprising the steps of storing information which comprises frame numbers of the particular negative of ordered and from which photographs are to be printed also stored in the quantity of photographs to be printed from each of said frames. One of said frames is then placed in the printing station, one of said numbers which corresponds to this frame is then read and a quantity of photographs to be printed from said a frame is printed based on the detected information.

According to one aspect of the present invention, there is provided a method of printing photographs comprising the steps of storing frame numbers of ordered picture frames involved in a transparency from which photographs are to be printed along with the quantity of photographs to be printed in a first memory, determining a reference position in said transparency, storing information comprising numbers of frames existing between the reference position and a frame or frames from which photographs are to be printed along with the quantity of photographs to be printed in a second memory, placing a frame from which photographs are to be printed in a position to have the information read and reading said information, and then printing based on said read information.

According to another aspect of the present invention, a system for printing photographs may comprise a first memory for storing frame numbers involved in a transparency, from which photographs are to be printed, and quantity of photographs to be printed, a second memory for storing informations comprising numbers of frames existing between a reference position and a frame or frames from which photographs are to be printed and the quantity of photographs to be printed, means for reading the information from said second memory, and means for printing based on the read information. The transparency is a negative film or reversal positivefilm.

Figure 8:
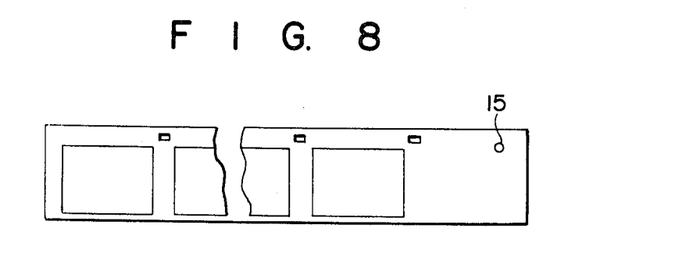
FIG. 8 shows a film strip having marking.

As the reference position, there can be selected one of the end frames of a transparency or one of the end portions of the transparency, which portions are located out of the frames, for example, a left end portion of the film strip shown in FIG. 8.

Figure 6:
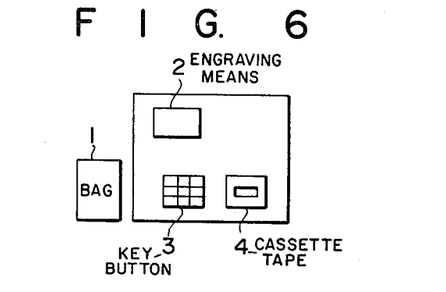
FIG. 6 shows a systematic diagram of the photographic printing method of the present invention, and, especially the order receiving part of the method of photographic printing.
Figure 7:
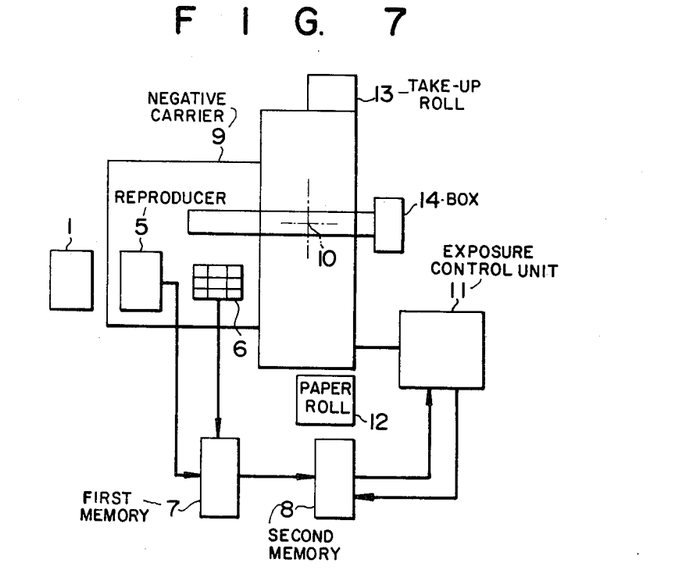
FIG. 7 shows a systematic diagram of the present invention, especially the printing part.

An embodiment of the present invention is illustrated below in detail with reference to the accompanying drawings. FIGS. 6 and 7 are system diagrams showing an embodiment of the present invention.

Referring to FIG. 6, reference number 1 is a bag which contains negative films and order sheet. Numeral 2 denotes an engraving means. The bags are piled one upon another, and the worker may make markings on the Table of the bag 1 by using an engraving means 2. The frame number ordered and the quantity of pieces to be printed are specified by the key buttons 3. This specification is recorded on the cassette tape loaded on the cassette tape recorder 4. The apparatus of FIG. 6 is essentially a receiving machine.

After the receiving processing is finished, the bags 1 and the cassette tape bearing recorded information through the cassette tape recorder 4 are fed to the printing operation at the next stage (FIG. 7). In the printer, the above-mentioned cassette tape is inserted into the reproducer 5. The bag 1 is taken one by one from the pile of bags 1 — [n ($n$ is any number), and the negative strip is taken out. At this moment, if one of the engraved numbers that are engraved for each bag is specified by the key button 6, the information, i.e., the ordered frame number and the ordered quantity of pieces to be printed that have been recorded by the receiving machine from the bag corresponding to the number in the cassette tape are transferred to the first memory 7. The reference number 9 stands for a negative carrier, and 10 represents an exposing part of the apparatus. The initial or top frame number in the negative frame is specified by means of key buttons 6 and transferred to the first memory 7. The ordered frame numbers which are stored in the first memory are compared with the initial or top frame number. And then numbers of frames existing between the initial or top frame and the ordered frames and quantity of pieces to be printed are transferred to a second memory. The frame numbers which are not ordered will bear information corresponding to no print.

When the negative strip is being carried to the exposing part 10 by means of the negative carrier 9, the information is read in sequence with the use of signals, which are signals of pictures obtained, for example, by detecting the holes provided in 110 film or 126 film printing is effected for the detected picture by quantity of photographs specified by the read information. If the top or initial frame of the film is determined as a reference position, the ordered frame will be found by counting numbers of frames from the initial frame to the ordered frame. And hence it is possible to stop the frame and subject it to automatic exposure. Numeral 12 stands for a paper roll, 13 is a means to take up the paper, 14 is a box in which will be piled the strips from the negative carrier 9 in order of the exposure.

According to the embodiment of the present invention, the accepting machine (FIG. 6) and the printing unit (FIG. 7) are separated; but they, of course, may be setup integrally thereby writing the numbers of ordered frames to be printed and the quantity of pieces to be printed with use of the key button 3 or 6 and specifying the initial frame number on the strip, in order to transfer them to the second memory 8 thereby arranging them with said initial number as a top. Moreover, the order sheet which can be read optically or electically may feed the number of ordered frames and ordered quantity of pieces to be printed to the first memory 7; in this case, marking 15 such as a hole at the tip of a long film may be made when cutting the film (see FIG. 8). When the film is passing, readng the hole aids to arrange the information that is transferred to the second memory 8.

According to the printing method of the present invention mentioned above, the ordered frame numbers and the quantity of pieces to be printed are memorized by the first memory, the information comprising the front end or rear end frame number of the strip and number of frames existing between the front end or rear end frame and the ordered frame from which photographs are printed is fed from the first memory to the second memory as the front or rear number of the negative strip is specified. The information is read from the second memory using the frame signals at the exposing unit and the printing is effected based on the information read from the second memory.

As mentioned above, according to the method of the present invention, the ordered printing can be processed without necessity to compare the order sheet with the ordered frame numbers; 3000 pieces of ordered printing can be effected per hour, which is 5 to 10 fold the capacity of a conventional printing methods. Inconvenience in identifying is also eliminated and, in addition, there is no need to arrange the negative strips in order.

Figure 9:
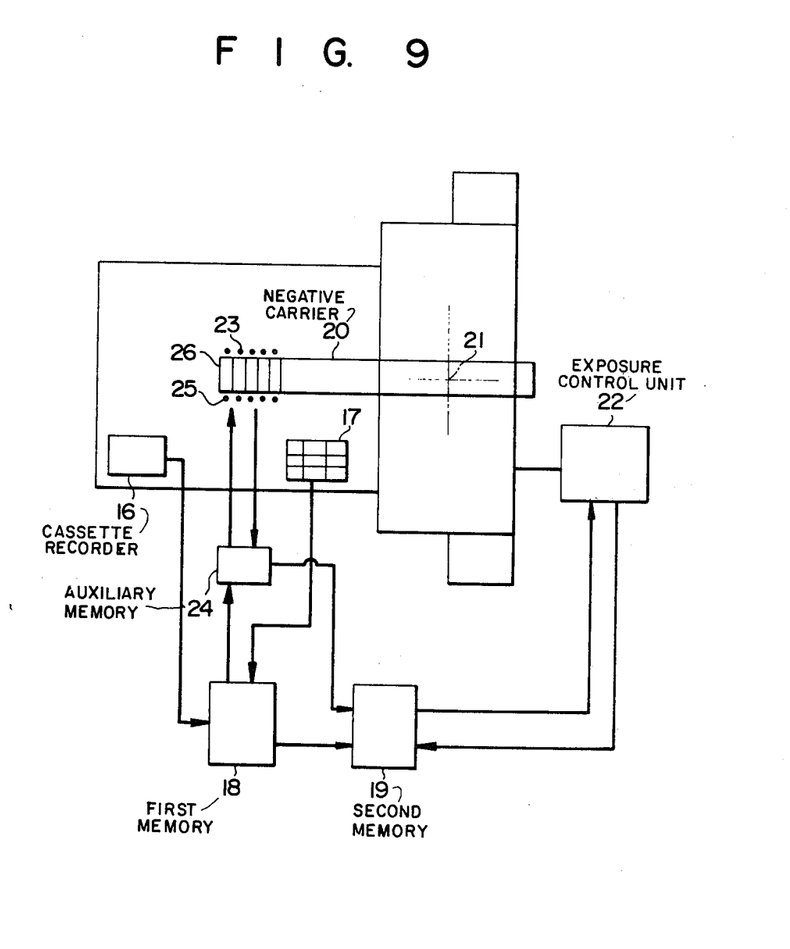
FIG. 9 is an example of manually correcting the color failure and density failure.

In the foregoing embodiment, the printer was illustrated to possess the exposure control device which automatically corrects color failure and density failure. In the following will be illustrated an example of correcting them by manually inputting the amount of correction, with reference to FIG. 9. In FIG. 9, the reference number 16 is a cassette tape recorder, 18 is a first memory, 19 is a second memory, 22 is an exposure control unit, 21 is the exposing unit and 20 is a negative carrier. Now, if the negative strip 26 is inserted in the negative carrier 20, the strip is stopped automatically by the conventional picture detector 23 which is provided on the negative carrier 20. The negative strip has at its lower part an indicator such as a light-emission diode to indicate the position of each frame. Information on said strip is specified by combining the information of the first memory 18 and the front end or rear end frame number specified by the key board 17, and the indication by the light emission diode is effected to indicate the frame number from which photographs are to be printed. If the amount of printing correction is given by means of the key button 17 starting from the initial picture frame that is shown by light emission indication, the amount of correction will be fed to the second memory 19 via the auxiliary memory device 24. When all indications by the light emission diode are turned off, the negative strip 26 is moved automatically and provides prints having printing corrections and keeping synchronism by means of the frame-signals of the exposing part 21 and the initial signal of the strip.

Figure 10:
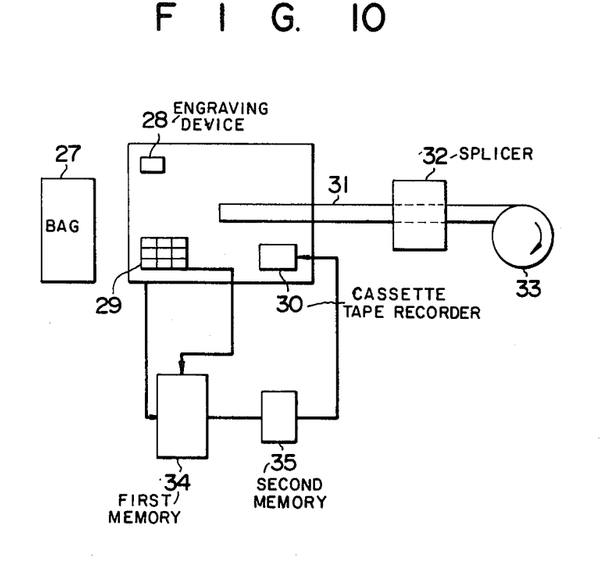
FIGS. 10 and 11 show another embodiment of the present invention to process the strip-shaped picture frames in a rolled manner.
Figure 11:
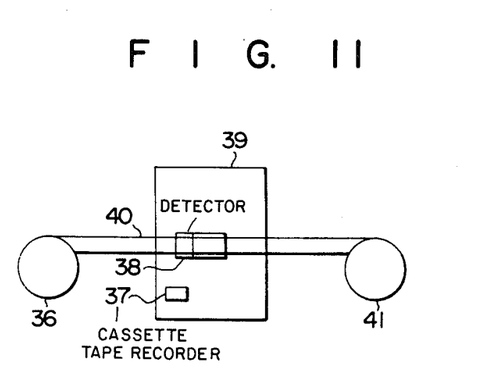

FIGS. 10 and 11 show another embodiment of the present invention, in which the strips bearing picture-frames are procesed in a rolled state.

In FIGS. 10 and 11, the reference number 27 is a bag, 28 is an engraving device, and 29 is a key button. The required frame numbers and the quantity of pieces ordered to be printed that are written on the bag 27 are written on the first memory 34 through the key button 29. Then in inserting the negative strips in the negative carrier 31, if the initial number is fed by means of the key button 29, printing information arranged such that ordered frame numbers are specified based on the initial number is written on the second memory 35 and transferred to the cassette tape recorder 30. The negative strips are fed to the negative carrier 31 and connected in order by the splicer 32 (conventional one) and taken up by the take-up device 33 into one roll.

The rolled band involving picture frames is fed to the rolling device 36, and at the same time, the cassette tape 30 bearing the recorded information is loaded on the cassette tape reproducer 37. The picture frame is fed to the negative carrier 40 and taken up by the take-up device 41. At this moment, the detector 38 detects a picture frame and the detection causes to read the information recorded on said tape one by one, before said picture frame passes through the exposing unit 39. The picture frame ordered is stopped at the exposing unit 39 for effecting printing of the required number of photos.

Embodiments of the present invention have been illustrated by the foregoing. Summarizing the foregoing, the present invention relates to a method and apparatus comprising a first memory which memorizes the frame numbers and quantity of photos to be printed that are written on the order sheet, means to specify a reference position such as the initial or the last picture frame of the negative strip, and the second memory which, upon receipt of the information of the specified reference position, as well as the number of frames between the reference position and the picture frame to be printed, memorizes the specified number and means for printing photographs from the picture frame.

Figure 12:
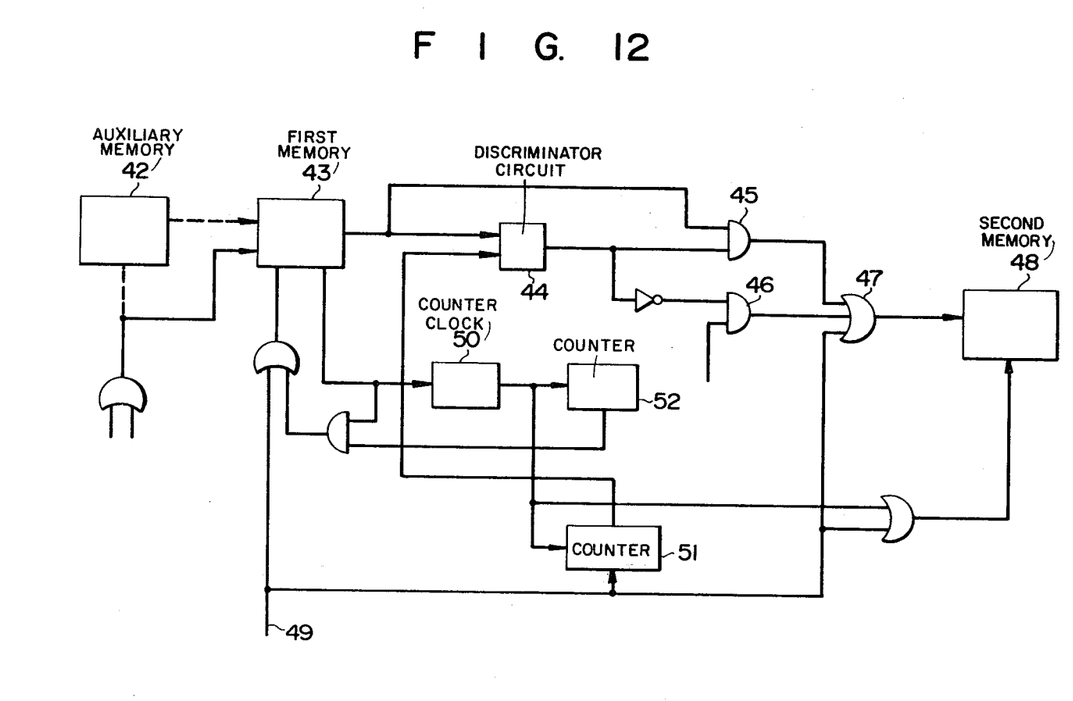
FIG. 12 is an example of the apparatus of processing information.

In the foregoing embodiments, details of devices for processing information are omitted. The following description illustrates an example of the detailed devices with reference to FIG. 12. In FIG. 12, the reference number 42 is an auxiliary memory which memorizes the required frame numbers as written on the bag and the quantity of photos to be printed therefrom. A bag is now taken up, and if the ordered number or bag and the order stored in the auxiliary memory 42 is equal the same, the reading command corresponding to the ordered number is given and transferred to the first memory 43. There is also another method in which one order is directly written on the first memory 43 thereby omitting the auxiliary memory 42. By specifying the number of the initial picture frame at 49, the information of the first memory 43 is transferred to the second memory 48. The transferring means is composed mainly of counter 51 and discriminator circuit 44. By feeding the initial frame number at 49, said number is set to the counter 51 and reading from the first memory 43 is started. The information corresponding to distance of the selected frame from the of strip front is also written on the second memory. When the first memory 43 contains the same picture frame number as the contents of the counter 51, the discriminator circuit 44 opens the gate 45 so that the quantity of photos to be printed is written on the second memory 48 via the gate 47. When the same picture frame number is not in the counter, the gate 46 is opened, and the command of don't print is written on the second memory 48 via the gate 47. The command of writing is repeated in synchronism with the counter clock 50, and the repetition is continued until the number (n) determined by the counter 52 is attained.

In this way, the contents of the first memory 43 consisting of numbers of n picture frames are transferred to the second memory 48, and written in the memory such that the numbers are arranged with the use of the reference number of the specified picture frame. After the second memory is programmed n times, the counter 51 is stopped to finish the printing of one strip. Such an operation is repeated for each strip, and the printing information corresponding to each picture frame is arranged and written on the second memory 48.

Figure 13:
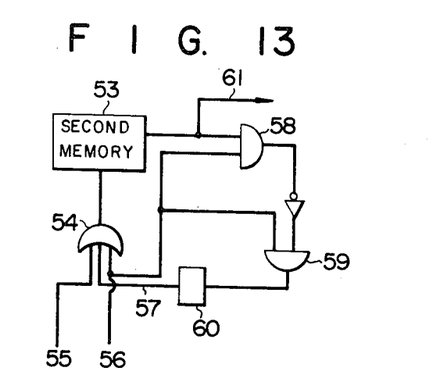
FIG. 13 shows an information processing part of the aforesaid printer.

FIG. 13 shows an example in which the printer treats such written information. In FIG. 13, the reference number 53 is a second memory which may be the same as the second memory 48 of FIG. 12 or may have information transferred by means of the cassette tape, ec. The reading command 54 may comprise the picture frame signal 55 which is produced when the picture frame strip is passed through the exposing unit, the signal produced for each strip (in the case of a roll, signals produced by detecting the connecting part, or in the case of a strip, the signals produced by detecting the front edge of the strip), and the pulse 57 which is produced repetitively until the front or initial signal of the strips and the front signal written in the memory are brought into agreement.

When the reading command 54 produced when the picture frame is passing through the printer produces the information from the memory to establish printing command 61, the picture frame is stopped at an exposing station for printing the number of repeating exposures memorized; when no printing is ordered, the command does not stop the picture frame. The reference number 58 is a circuit for aligning the front end of the subject picture and always functions to write the information comprising a predetermined number ($n$) on the second memory when arranging the information corresponding to the negative strip as mentioned with reference to FIG. 1. However, the number of picture frames in the strips may not necessarily be agreed to the capacity provided in the memory for each strip. For example, when the number of picture frames of the strip is 6, memory capacity availability (second memory) should be 8 ( $n=8$) taking some allowance. In this case, there are two additional items of information for each strip. Some strips may have 3 subject pictures. In such a case, there are five additional items of information for such a strip. But since the front end of the picture frame and the front end of the information in the memory are in conformity, the remainder of the information is not necessary when processing of the strip if finished and the following strip comes to the exposing surface. In effect, information up to the succeeding front signal is not necessary. For this reason, the embodiment shown in the drawing employs the circuit for aligning the front in the picture frame. That is, when the reading command is given by the front signal 56 which is produced by detecting the front of the negative strip, if the information from the second memory 53 is not a front signal, the circuit 58 discriminates it. By this discrimination the gate 59 is opened so that the clock pulse circuit 60 functions to produce a reading command which is repeated until the front signal appears on the second memory 53.

The information is aligned in this way; hence reading the information from the second memory and processing the picture frames are synchronized properly to effect printing of the picture frames in accordance with the order. In the printing system shown in FIGS. 6 and 7, the second memory 53 may be of an endless memory system combined with the counter, or in the embodiment shown in FIGS. 10 and 11, the second memory may temporarily memorize the information transferred from the cassette tape.

Figure 14:
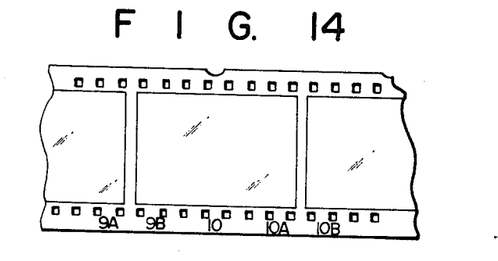
FIG. 14 shows an example of a film in which a plurality of numbers are given to the one picture frame of the negative film.

The aforementioned embodiments of the present invention can be applied to 110 size film which has one number for one picture frame. But it should be understood that the present invention is not limited to printing the films which have one number for one picture frame. In 135 films, no predetermined relationship between the position of numbers and the position of the picture frame exists. Therefore, the negative may bear the film number such as 1, 1A, 1B, 2, 2A - - - for easy ordering (FIG. 14 shows an example in which one picture frame is described).

When ordering to print the picture frames, the frame number (9 B) at the center of the picture will usually be referred to; but some customers may specify the number 10 or 10A for the above frame. In such a case, any one of 9B, 10 and 10A have to serve for identifying the same picture frame. When inputting the frame numbers into the first memory, a converter is used. The converter functions to convert the input of 1, 1A, 1B, 2, 2A - - - into the output of 1, 2, 3, 4, 5 - - -. In memorizing information in the second memory, the initial number memorized in the second memory is identified as representing a first or second number memorized in the first memory. Therefore, if any one of the numbers, e.g. 1, 1A, 1B, 2, 2A - - - is specified, a frame number corresponding to the specified number can be read from the second memory without any error.

The strips may have or may not have notches. But processing can be done without confusion as it is possible to produce the picture signals and strip front signals when printing the picture frames using a conventional means called picture detection.

Further, a vacant frame between the subject pictures of the strip may not exist, or the front or rear of the film may not have a picture. In such a case, processing of information based on only the picture frame signals and strip front signals may invite erroneous information at portions where there are no pictures, because no picture signals will be produced. To avoid such inconvenience, it is necessary to synchronize the information employing means to distinguish this information by producing a dummy signal when no picture frame signal is produced even at a position where the picture frame should have naturally existed as determined from the distance the film has moved.

Figure 15:
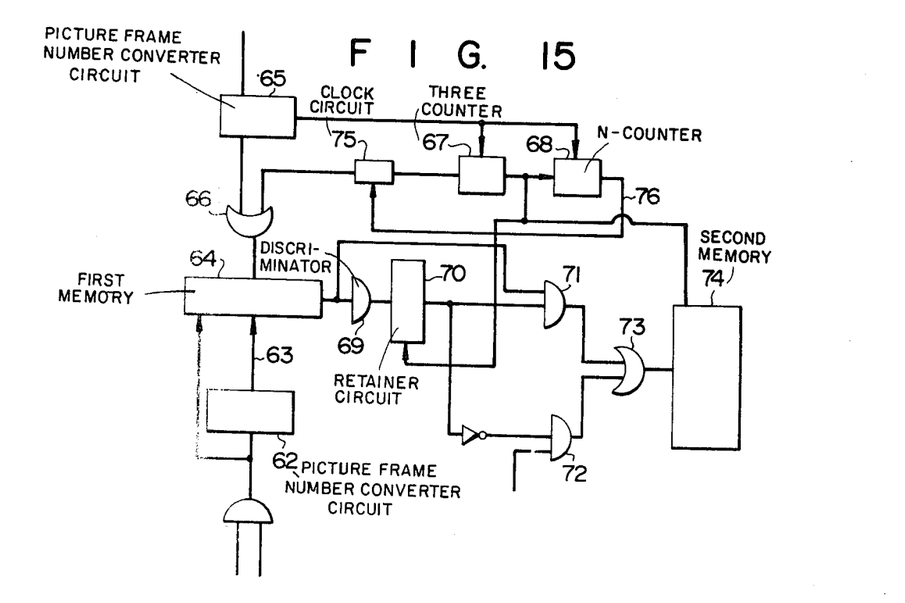
FIG. 15 shows an example of the information processing circuit of the 135 film.

FIG. 15 shows an example of the circuit for processing information in the case of 135 film. Only the number of picture frames ordered is fed by number 63 via the picture frame number converter circuit 62, and stored by the first memory 64. The front identifying signal of the strips is also converted via the picture frame number converter circuit 65, and turns to a reading command of the first memory via the gate 66. The picture frame number converted and the information concerning the quantity to be printed are read from the first memory, and only the picture frame number converted is fed to the discriminator circuit 69. This discriminator circuit 69 is the same as the discriminator circuit 44 shown in FIG. 12. Then the clock circuit 75 functions to produce a reading command for the first memory, and the information is read in turn. The reading is continued until the counter 68 counts the specified value. The counter 68 is the same as the counter 51 of FIG. 12, and has a 3 counter 67 at its forward stage. The counter 67 provides one pulse per three pulses to the n counter 68. A stop command 76 is given to the clock circuit as the specified number is attained. When the output from the first memory contains a printing command, the discriminator circuit 69 gives a retaining command to the retainer circuit 70. The retainer circuit 70 is cleared by the pulse produced from the 3 counter 67. The pulse also serves as a writing command to the second memory. When the gate of the gate circuit 71 is functioning, the writing information bears the order of printing and feeds the quantity of prints to the second memory 74 via the gate 73; when the gate of the gate circuit 72 is functioning, the command of no printing will enter thereto.

By setting up as mentioned above, the information can be arranged even for those having several kinds of frame numbers and therefore information can be processed for any type of picture frame discussed above. That is, the customer may employ any kind of numbers numbered on the picture frame. Also, the picture frame at the front of the strip may be specified so that the information can be arranged to indicate negatives not to be printed or to indicate the quantity of photos that are to be printed. This is quite the same as the film of which one picture frame is represented by one number. And if the picture frame signals and negative strip front signals are provided, the printer can perform printing as ordered without confusion.

As mentioned above, according to the present invention, the ordered printing can be effected without needing to compare the picture frames and the order sheet, thereby needing no attendant for finding the picture frames at the time of printing, contributing to speed up the processing. As a consequence, it is made possible to process the ordered printing which so far was very inefficient, thereby preventing erroneous printing and providing a printing method and apparatus which can deal with more than 5 times as many negatives at a time as compared to the earlier printing methods, and provides great industrial value.

What is claimed is:

1. A system for printing photographs from a negative film in which each frame on said negative film is assigned a different frame number comprising,
   a. a first memory for storing frame numbers of the frames to be printed and the quantity of photographs to be printed of each said frame number,
   b. a second memory connected to the first memory, said second memory storing information comprising numbers of frames existing between a reference position of the negative film and the required frame or frames,
   c. means for reading the information in said second memory,
   d. means for printing a selected number of photos of selected frames based on the information contained in said second memory, and
   e. means for generating a signal representing an end portion of the negative film and means for discriminating whether the information of said required frame numbers memorized in said first memory coincides with the numbers counted on the basis of said end potion representing signal.

2. A system for printing photographs from a negative film in which each frame on said negative film is assigned a different frame number comprising,
   a. a first memory for storing frame numbers of the frames to be printed and the quantity of photographs to be printed of each said frame number,
   b. a second memory connected to the first memory, said second memory storing information comprising numbers of frames existing between a reference position of the negative film and the required frame or frames,
   c. means for reading the information in said second memory,
   d. means for printing a selected number of photos of selected frames based on the information contained in said second memory, and
   e. a transfer circuit provided between said first memory and said second memory, which transfer circuit comprises a gate and a counter, said gate opening when said first memory contains the same picture frame number corresponding to the number outputted by said counter.

* * * * *